Nov. 30, 1926.

J. H. ASHBAUGH 1,608,761

SPEED REGULATOR SYSTEM

Filed Dec. 4, 1924

INVENTOR
John H. Ashbaugh.
BY
*Wesley G. Carr*
ATTORNEY

WITNESSES:

Patented Nov. 30, 1926.

1,608,761

UNITED STATES PATENT OFFICE.

JOHN H. ASHBAUGH, OF PITTSBURGH, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed December 4, 1924. Serial No. 753,865.

My invention relates to regulator systems and more particularly to regulator systems for governing the speed of direct-current motors.

One object of my invention is to provide a regulator system that is quick acting and accurate in its operation for maintaining a constant speed upon the regulated motor.

Another object of my invention is to provide a regulator system of the above-indicated character that is responsive to load changes upon the motor.

A further object of my invention is to provide a regulator system of the above-indicated character with means for momentarily forcing the field strength of the motor before the regulator has had sufficient time to correct for a change in speed or in load upon the motor.

My invention contemplates the use of a motor operated rheostat in the field circuit of the controlled motor, reversing switches for controlling the rheostat motor, relays controlled by the reversing switches to temporarily cut resistance in or out of the motor field circuit while the rheostate is in operation, and regulator means for controlling the reversing switches.

The regulator comprises a pair of contact-carrying arms or levers, the contact members of which control the operating circuits of reversing switches. One of these levers is controlled by a magnet having a winding in series circuit relation with the field winding of the controlled motor, the magnet tending to regulate for a constant field strength upon the motor. The second of these levers is connected to be actuated by a magnet having a winding connected in parallel circuit relation to the interpole field winding of the controlled motor. This magnet is responsive to load changes upon the motor and tends to regulate for constant armature current. Inasmuch as this magnet anticipates speed changes following changes in load upon the motor, it also acts as an anti-hunting element. This second lever, actuated from the interpole winding, is mounted on a floating pivot that is supported upon a third lever, the position of which is varied in accordance with the speed variations of the controlled motor. The third-mentioned lever is connected to be operated by the middle element of a mechanical differential device that is differentially responsive to the speed of the controlled motor and of a speed reference means.

My invention will be better understood by reference to the accompanying drawing, wherein the single figure is a diagrammatic view of the apparatus and circuits embodied in a preferred form of my invention.

Referring to the drawing, an electric motor 1 is provided having an armature winding 2, a field winding 3, and an interpole winding 4 that is connected in series circuit relation with the armature winding. The motor is energized from any suitable source of power 5, 6. A motor-operated rheostat 7 is provided in the field circuit of the motor, and is controlled by means of reversing switches 8 and 9 in accordance with the operation of the regulator, indicated generally at 10.

The control circuits for the reversing switches are governed in accordance with the operation of contact members 11, 12 and 13. The contact members 11 and 12 are mounted upon a bifurcated lever or control arm 14, which is mounted upon the fixed pivot 15 and is controlled in accordance with the operation of an electromagnet 16 against the action of a tension member 17. The magnet 16 comprises a core member 18, having its upper end attached to the lever 14 and its lower end attached to a dash-pot 19. Upon the core member 18 a winding 21 is provided, which is connected in series circuit relation with the field winding 3 of the motor 1.

The contact member 13 is mounted upon one end of a lever 22, which is pivotally mounted upon a floating pivot 23, and is actuated by an electromagnet 24. The electromagnet 24 comprises a core member 25, having its upper end connected to the lever 22 and its lower end connected to a dash-pot 26, and is provided with a winding 27 that is connected in parallel circuit relation to the interpole winding 4. The floating pivot 23 is mounted upon a lever 28, one end of which is mounted upon a fixed pivot 29. The other end of the lever 28 is connected to a dash-pot 31, and to a rod 32, communicating with the middle element 33 of a mechanical differential device. To the lever 22 there are attached biasing members 34 and 35, the former having one end connected to the rod 32, and the latter having one end fixed, so that a change in the position of the rod 32 changes the normal or neutral position of the lever 22 corresponding to a balanced bias in the two elements 34 and 35.

One side or sun gear 36 of the mechanical differential device is connected to a single phase synchronous motor 37, which is energized from a constant frequency source 38, 39. The other side or sun gear 41 of the mechanical differential device is connected to a single-phase synchronous motor 42 that is energized from a single-phase alternating-current generator 43, which is, in turn, mechanically connected by means of a shaft 44 to the motor 1, so that the generator 43 and the motor 42 will be actuated in accordance with the speed of the motor 1.

The operation of the regulator 10 controls the energization of the operating coils of the reversing switches 8 and 9 from a source of direct-current supply 45, 46. The reversing switches 8 and 9 are of like construction and each comprises an operating lever 47, and a pair of core members 48 and 49. Upon the core member 49 a holding coil 51 is provided, which is connected to be continually energized from the source 45, 46. A deenergizing coil 52, which is differentially wound with respect to the coil 51, is also provided upon the core 49 and is connected in series circuit relation with an operating coil 53 that is wound upon the core member 48. The operating coil 53 of the switch 9 is connected to the contact member 11 of the regulator, while the operating coil of the switch 8 is connected to contact member 12 of the regulator.

A resistor 54 is connected in series circuit relation with the field winding 3 and with the resistor element 55 of the rheostat 7. The rheostat 7 comprises the resistor element 55 and a contact-making arm 56 that is mechanically connected to be operated by a pilot motor 57. The pilot motor 57 comprises an armature winding 58 and a field winding 59. The field winding is connected to the source of supply 45, 46. The armature winding is connected through limit switches 61 and 62 to the respective operating levers 47 of the reversing switches 8 and 9, and through contact members 63 and 64 of the reversing switches and conductors 65 and 66 to the source of supply 45, 46.

Relays 67 and 68 are connected to be actuated in acocrdance with the operation of the reversing switches 8 and 9, respectively. The relay 67 comprises a contact-carrying arm 69 that is normally urged upwardly by a biasing member 71, upon which is mounted a contact member 72 that is adapted to engage a fixed contact member 73. The relay also comprises an operating winding 74 which, when energized, causes the arm 69 to be moved downwardly against the action of the biasing member 71, and thus causes the contact member 72 to engage the contact member 73 to short circuit the resistor 54. The winding 74 is connected in parallel circuit relation to the operating arm 47 and the contact member 63 of the reversing switch 8.

The relay 68 is provided with a contact-carrying arm 75 and a biasing member 76 that urges the arm in an upwardly direction. A contact member 77 is carried upon one end of the arm and is adapted to engage a contact member 78. An operating winding 79 is provided which, when energized, causes an engagement of the contact members 77 and 78. The winding 79 is connected in parallel circuit relation to the operating arm 47 and the contact member 64 of the reversing switch 9.

The operation of the regulator system is as follows:

The magnet 16 operates as a constant current regulator to maintain a constant field strength upon the motor 1. In the illustrated position of the regulator 10, that is, with the contact members 11, 12 and 13 disengaged, the reversing switches 8 and 9 will be held by their respective holding coils 51 in the position illustrated in the drawing, thus forming a dynamic braking circuit for the pilot motor 57, through the contact members 64. In this position of the reversing switches, the operating coil 74 of the relay 67 will be energized, causing an engagement of the contact members 72 and 73, thereby short-circuiting the resistor 54. The operating coil 79 of the relay 68 will be deenergized because of the engagement of the operating arm 47 of the reversing switch 9 with the contact member 64.

Should the speed of the motor 1 fall below the desired value, the rod 32 will be moved downwardly and contact member 13 will engage the contact member 12, thus energizing the operating coil 53 and the deenergizing coil 52 of the reversing switch 8. This action will cause the switch arm 47 to move into engagement with the contact member 63 and to disengage the contact member 64, thereby causing the pilot motor 57 to operate the rheostat 7 in a direction to weaken the value of the motor field excitation. Simultaneously with the operation of the reversing switch 8, the operating coil 74 of the relay 67 will be deenergized, permitting a disengagement of the contact members 72 and 73 and inserting the resistor 54 in circuit with the field winding 3, thereby forcing the value of the motor field excitation during the operation of the rheostat. As soon as the regulator contact members 12 and 13 become disengaged, the reversing switch 8 and the relay 47 will again return to their normal positions, as described above.

Should the speed of the motor rise above its proper value, the contact member 13 will engage the contact member 11, thus causing the operating coil of the reversing switch 9 to be energized and the contact-making arm 47 to disengage the contact member 64 and engage the contact member 63; whereby the pilot motor 57 will be operated in a direction to strengthen the motor field and reduce the motor speed. Simultaneously with the operation of the reversing switch 9, the operating winding 79 of the relay 68 will be energized, causing the contact members 76 and 77 to become engaged, to thus short-circuit a portion of the resistor 55 that is in circuit with the motor field winding, thereby forcing the value of the motor field strength.

The magnet 16 operates as a constant-current regulator to maintain a constant field strength upon the motor 1, the particular value of the field strength depending upon the normal positions of the lever 22 and the contact member 13. The contact member 13 is actuated in accordance with the energization of the interpole winding 4, being assisted by the operation of the spring 34 and opposed by the operation of the spring 35. The magnet 24 thereby operates as a constant-current regulator to maintain a constant armature current upon the motor 1.

There are, therefore, two regulators, one operating to maintain a constant current in the field circuit of the motor, and the other operating to maintain a constant current in the armature circuit of the motor. The particular values of field and armature current, which the regulator attempts to maintain, depend upon the position of the lever 28 and upon the normal or neutral position of the contact member 13 as determined by a balanced tension in the springs 34 and 35. When the motor 1 varies from the speed of the speed reference means or synchronous motor 37, the differential element or device and the rod 32 move to change the setting of the lever 28 and the tension upon the springs 34 and 35, so that the magnets 16 and 24 regulate for different field and armature currents. Should the variations in speed be gradual, the change in the position of the lever 28 will also be gradual, but should a sudden change in speed take place, the movement of the mechanical differential device will be correspondingly faster.

Assuming that the regulator is in operation and that a heavy load comes on the motor, it is necessary, under such circumstances, to reduce the field strength in order to maintain the speed at this increased load. The motor speed tends to immediately decrease, by reason of the increased load, causing the differential device to move the lever 28 in a downward direction. The movement of the lever 28 lowers the position of the pivot 23 and causes the lever 22 to pivot momentarily at the joint 81, to effect the engagement of contact members 12 and 13, thereby operating the reversing switch 8 and causing a change in the setting of the rheostat 7, as explained above. In a like manner, an increase in the speed of the motor 1 would cause the regulator to raise the lever 28, causing the contact members 11 and 13 to become engaged and operate the reversing switch 9 to correspondingly adjust the setting of the rheostat 7.

The floating lever 22 will pivot at the point 81 on rapid changes in load since the dash-pot 26 permits only gradual changes in the position of the point 81. As the speed is corrected, the lever 22 again pivots at the point 23, thus opening the regulator contact members and anticipating changes in speed. For a given motor speed, there will be a predetermined position of the pivot 23 for a given load upon the motor.

Many changes may be made in the details and arrangement of the apparatus and circuits disclosed in this specification, without departing from the spirit or scope of my invention and I do not wish to be limited other than by the scope of the appended claims.

I claim as my invention:

1. In a regulator system, a speed-reference means and a motor to be controlled having an armature winding and a field winding, a regulator for controlling said motor comprising means actuated in accordance with the energization of said field winding, means cooperating with said last-named means and actuated in accordance with the energization of said armature winding, means for temporarily forcing the field excitation of said motor upon the initiation of a corrective movement, and means for changing the setting of said regulator actuated in accordance with the differential relation between said speed reference means and said motor.

2. In a regualtor system, a speed-reference means and a motor to be controlled having an armature winding and a field winding, regulator means for said motor comprising a motor-operated rheostat in series circuit relation with field winding and a pair of contact arms for controlling said rheostat, means for actuating said contact arms in accordance with the load conditions of said motor, means for temporarily forcing the field strength of said motor upon the initiation of a corrective movement of said rheostat, and means differentially responsive to the speed of said speed-reference means and of said motor for varying the setting of said regulator.

3. In a regulator system, a speed-reference means and a motor to be controlled having an armature winding and a field winding, a resistor in circuit with said field winding, means for normally short-circuiting said resistor, a rheostat in circuit with said field winding, regulator means for controlling said rheostat comprising an element actuated in accordance with the current of said field winding and an element actuated in accordance with the current of said armature winding, means differentially responsive to the speed of said reference means and to the speed of said motor for varying the cooperative relation between said elements, and means for short-circuiting said rheostat.

4. In a regulator system, a motor having a field winding and an armature winding, means for regulating the speed of said motor comprising a pair of contact-carrying arms, means for actuating one of said contact arms in accordance with the energization of said field winding, means for actuating the other of said contact arms in accordance with the energization of said armature winding, and means for forcing the field excitation of said motor temporarily upon the initiation of a corrective movement.

5. In a regulator system, a motor having a field winding and an armature winding, means for regulating the speed of said motor comprising a motor-operated rheostat in circuit with said field winding, a pair of contact-carrying arms for governing the operation of said rheostat, means for actuating one of said contact arms in accordance with the energization of said field winding, means for actuating the other of said contact arms in accordance with the energization of said armature winding, means actuated in accordance with the variations in speed of said motor for modifying the operation of said contact members, and means operative upon the initiation of a movement of said rheostat for forcing the field strength of said motor.

6. In a regulator system, a motor having a field winding and an armature winding, a motor-operated rheostat and a normally short-circuited resistor connected in series-circuit relation with said field winding, regulator means for governing the operation of said rheostat comprising means actuated in accordance with the energization of said field winding, means actuated in accordance with the energization of said armature winding, and means actuated in accordance with variations in speed of said motor, means actuated in accordance with the operation of said regulator for inserting said resistor in said motor field circuit, and means actuated in accordance with the operation of said regulator for short-circuiting said rheostat.

7. In a regulator system, a motor having a field winding and an armature winding, a motor-operated rheostat connected in series circuit relation with said field winding, means for governing the operation of said rheostat comprising means actuated in accordanc with the energization of said field winding, means actuated in accordance with the load on said motor, and means actuated in accordance with the variations in speed of said motor, and means operated simultaneously with the operation of said rheostat for forcing the field excitation of said motor.

In testimony whereof, I have hereunto subscribed my name this 28th day of November, 1924.

JOHN H. ASHBAUGH.